(12) United States Patent
Torres

(10) Patent No.: US 6,508,311 B1
(45) Date of Patent: Jan. 21, 2003

(54) APPARATUS, SYSTEM AND METHOD FOR INSTALLING AND RETRIEVING PIPE IN A WELL

(76) Inventor: Carlos A. Torres, 748 Blalock Rd., Houston, TX (US) 77024

( * ) Notice: Subject to any disclaimer, the term of this patent is extended or adjusted under 35 U.S.C. 154(b) by 17 days.

(21) Appl. No.: 09/677,536

(22) Filed: Oct. 2, 2000

Related U.S. Application Data

(63) Continuation-in-part of application No. 09/571,134, filed on May 15, 2000, now Pat. No. 6,250,395.
(60) Provisional application No. 60/163,869, filed on Nov. 5, 1999.

(51) Int. Cl.$^7$ ............................................... E21B 23/00
(52) U.S. Cl. ...................... 166/382; 166/384; 166/72.2; 166/85.5; 166/96.1; 166/75.14; 166/117.5; 166/242.2; 166/242.3
(58) Field of Search ................................ 166/381, 382, 166/384, 77.1, 77.2, 85.1, 85.5, 96.1, 75.14, 117.5, 242.1–242.3; 175/5–10

(56) References Cited

U.S. PATENT DOCUMENTS

| | | | |
|---|---|---|---|
| 2,453,038 A | | 11/1948 | Rossmann |
| 2,548,616 A | | 4/1951 | Priestman et al. |
| 3,667,554 A | * | 6/1972 | Smitherman |
| 3,724,567 A | | 4/1973 | Smitherman |
| 4,708,563 A | * | 11/1987 | Van Den Berg et al. |
| 4,848,455 A | | 7/1989 | Fenyvesi |
| 5,547,314 A | | 8/1996 | Ames |
| 5,975,207 A | | 11/1999 | Smitherman |

* cited by examiner

Primary Examiner—Roger Schoeppel
(74) Attorney, Agent, or Firm—Browning Bushman P.C.

(57) ABSTRACT

A string of pipe formed by the connection together of multiple joints of shorter pipe segments is stored in the water space adjacent an offshore drilling rig. The pipe string bends from the drilling rig floor in a semicircular arc and enters the water adjacent the drilling rig. A curving guide is used to direct the pipe string movement. A platform extension from the corner of the drilling rig is provided to position a work area above the point at which the pipe enters the water. Multiple guides may be employed for simultaneously running two strings of pipe. The string may be stored in one or more long sections or in a single continuous string. The major portions of the string or long pipe sections may be stored below the surface of the water. Provision is made for pumping fluids through the pipe string, and/or the pipe sections, to the well. The string may be stored in a sleeve. A flexible hose attached to the end of the drill string permits pumping of fluids into the well through the string while the string is in the sleeve. An air supply to the sleeve assists in maintaining the buoyancy of the sleeve and its contents. A pulling system is provided to assist in pulling the drill string through the sleeve.

17 Claims, 5 Drawing Sheets

APPARATUS, SYSTEM AND METHOD FOR INSTALLING AND RETRIEVING PIPE IN A WELL

CROSS REFERENCE TO RELATED APPLICATIONS

This application is a continuation-in-part to U.S. patent application Ser. No. 09/571,134 filed May 15, 2000 entitled "Apparatus, System and Method for Installing and Retrieving Pipe in a Well," now U.S. Pat. No. 6,250,395, which is related to Provisional Application 60/163,869, filed Nov. 5, 1999. Said applications are incorporated herein for all purposes and the benefit of the earlier filing dates of said application is claimed herein.

FIELD OF THE INVENTION

The present invention, as with the inventions in the previously mentioned patent applications, relates to apparatus systems and methods for running and storing pipe used in the drilling and completion of wells.

BACKGROUND OF THE INVENTION

Currently, pipe used in drilling and completing wells is stored in the derrick or stored in racks on the drilling structure. When the pipe is being temporarily removed from the well, it is pulled from the well in stands of three or four joints and stored vertically in the derrick. Going back into the well, the process is reversed.

When using a top drive or traveling block to run pipe in and out of the well, the time required to come out of the well includes the time required to attach to the top of the drill string, pull a stand up above the floor, unthread the stand, set it back in the derrick, and return the top drive or traveling block down to the floor to engage the drill string to pull another stand.

In an invention described in the previously identified patent applications, the pipe used to drill and complete an offshore well is run into and out of the well in a continuous string of jointed pipe sections. The water area surrounding the drilling structure is used to store the pipe in a continuous string or in a series of relatively long string segments. The pipe string is conveyed through a curved guide extending from the drilling rig to the water area adjacent the drilling structure. The radius of curvature of the guide is greater than the minimum permitted non-yielding radius of curvature for the stiffest string of pipe to be used in the drilling or completion of the well.

The large drill pipe used to drill wells in deep water can have a cross sectional diameter of 6 ⅝ inches or larger. A curved guide capable of handling such drill pipe preferably has a radius of curvature of approximately 160 ft. The distance from the point on the drilling rig floor at which the pipe exits the well to the point at which the pipe is redirected back into the water is therefore approximately 320 ft. Very large drill ships have adequate room to accommodate the required 320 ft. spacing between the drilling rig floor and the water entry point. Such is not the case in smaller rigs such as semi-submersible rigs.

The distance from the rotary table to the furthest edge of a semi-submersible drilling structure is typically less than 200 ft. One object of this invention is to adapt the pipe handling system, method and apparatus described in the previously identified applications for use on a semi-submersible rig.

It may be desirable to maintain circulation through the string of pipe stored in the sea. It may also be desirable to displace the drilling fluid contained within the drill pipe before it is stored in the sea.

Very long strings of pipe inserted into a storage sleeve may require a means for assisting the insertion of the drill string into the sleeve.

It may also be desirable to have multiple strings of pipe stored in the sea with multiple systems available for separately, or simultaneously, supplying the strings to the drilling rig floor. Such is the case, for example, when two completion strings are simultaneously run into the well in what is termed a "dual completion."

SUMMARY OF THE INVENTION

Drilling structures that lack sufficient deck space to accommodate a large bending radius guide are provided with a platform extension to position a work area at the location where the string completes its 180-degree curve and extends vertically into the water. In a preferred embodiment, the platform extension is positioned at one corner of a four-cornered deck of a semi-submersible drilling rig to minimize the length of the platform required to extend to the point of the completion of the drill pipe curve.

Multiple guides may be employed for simultaneously running two strings of pipe. The string may be stored in one or more long sections or in a single continuous string. The major portions of the string or long pipe sections may be stored below the surface of the water. Provision is made for pumping fluids through the pipe string, and/or the pipe sections stored in water, to the well. The string may be stored in a sleeve. A flexible hose attached to the end of the drill string permits pumping of fluids into the well through the string while the string is in the sleeve. An air supply to the sleeve assists in maintaining the buoyancy of the sleeve and its contents. A pulling system is provided to assist in pulling the drill string through the sleeve.

DESCRIPTION OF THE ILLUSTRATED EMBODIMENTS

Figure 1:
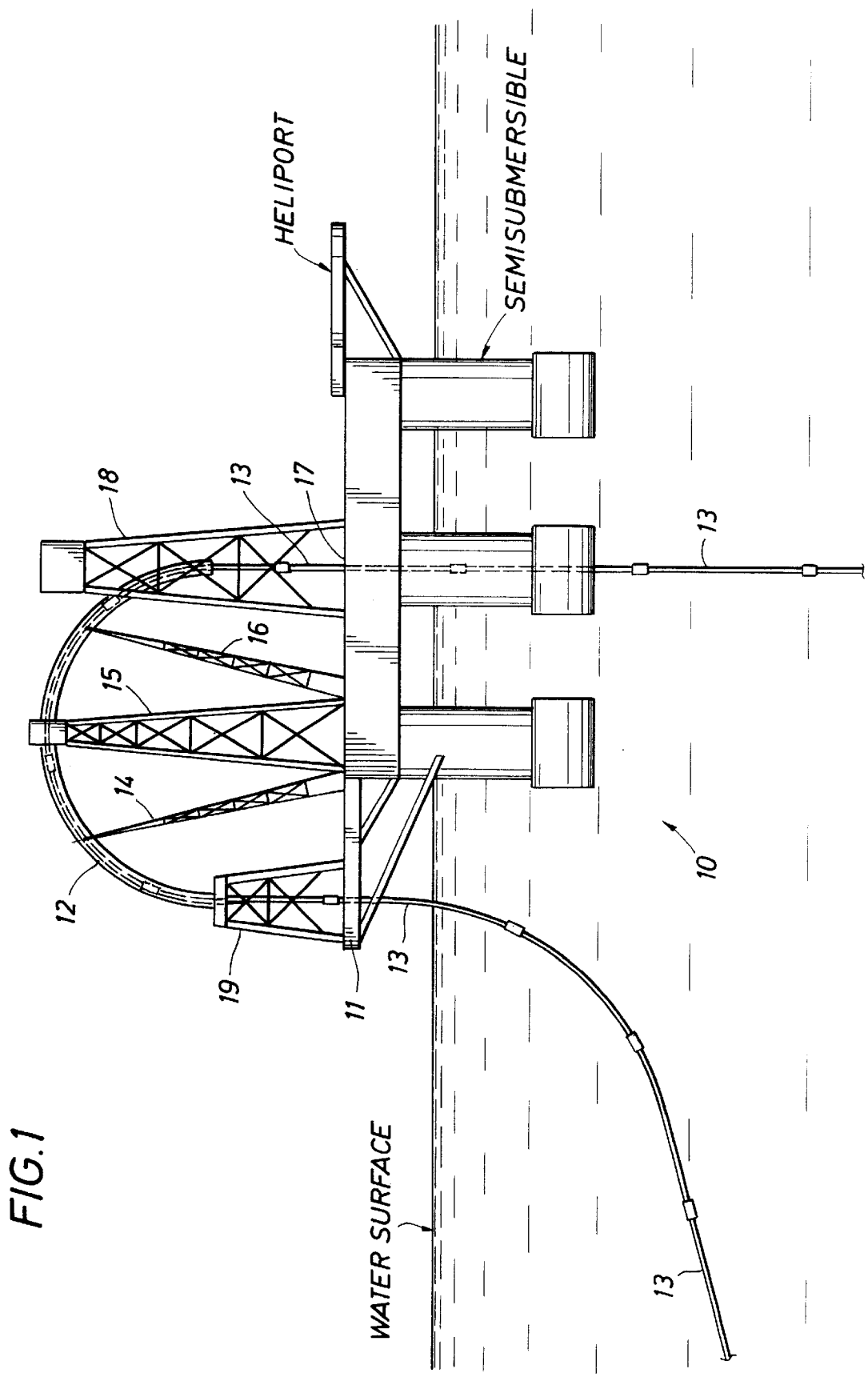
FIG. 1 is a schematic illustration of a semi-submersible rig equipped with a platform extension for accommodating a 320 ft. diameter pipe string curve.
Figure 2:
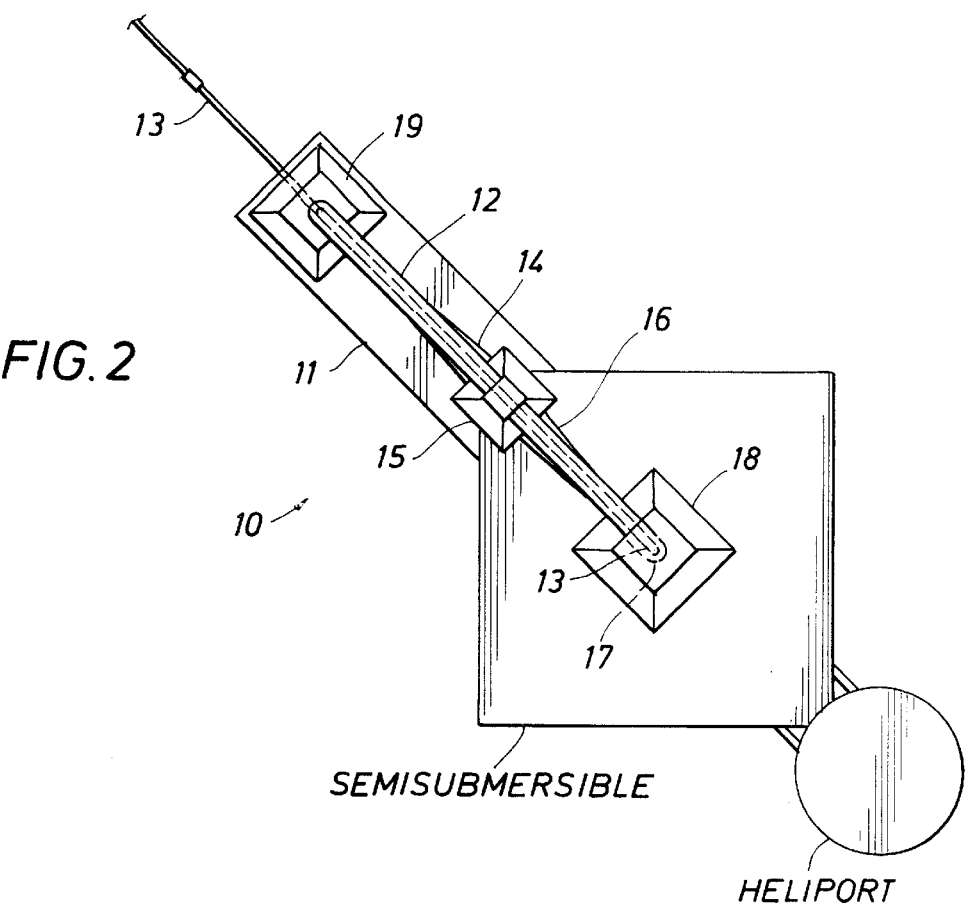
FIG. 2 is a top view of the rig illustrated in FIG. 1.

FIG. 1 illustrates a semi-submersible rig indicated generally at 10 having a platform extension 11 provided at one corner. FIG. 2 illustrates a plan view of the rig illustrated in FIG. 1. Placing the platform extension 11 at the corner of the rig permits maximum usage of the semi-submersible deck surface. The platform extension 11 is illustrated extending away from the corner of the rig sufficiently to accommodate a curving guide 12 having a radius of curvature sufficient for handling pipe 13 requiring a bending radius of 160 ft. Guide supports 14, 15 and 16 hold the guide in position as the pipe is moved between a drilling rig floor 17 through a mast 18 to a work area mast 19.

Figure 3:
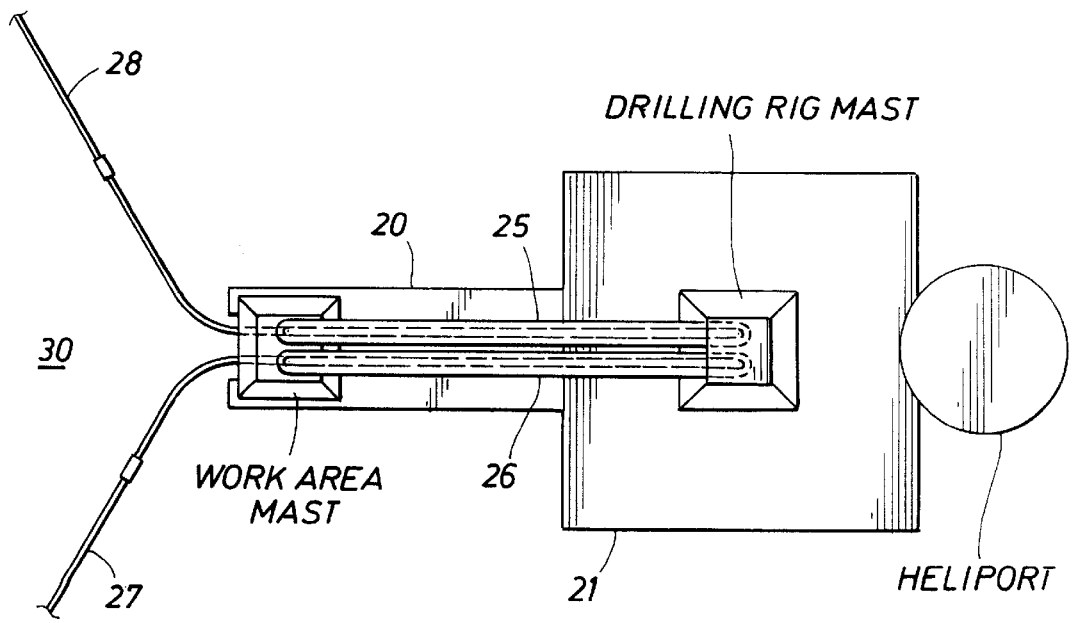
FIG. 3 is a top view of a semi-submersible rig equipped with multiple curved guides for simultaneous handling of multiple pipe strings.

FIG. 3 illustrates a platform extension 20 formed on the side of the drilling structure 21 and illustrates the use of two guides 25 and 26 for simultaneously handling two separate strings 27 and 28. A drill string or completion string 27 and a completion string 28 are illustrated extending from the water area 30 adjacent the drilling structure 21 and through the guides 25 and 26 to the drilling rig. The use of multiple guides permits drilling and/or completion operations to be conducted simultaneously and speeds the conversion between running the drill pipe and running the completion string or other type of work string. Thus, a string of drill pipe may be moved through one guide to permit the well bore to be drilled in one well and a string of tubing may be simultaneously moved through another guide to conduct a completion operation in another well being completed from the same drilling structure. Similarly, two drill strings may be simultaneously moved in the multiple guides to drill two separate wells. Dual completions are also made possible with the multiple guides. In a dual completion, two tubing strings may be simultaneously run in two separate guides to install two tubing strings in a single well. There are other occasions where it may also be desirable to have multiple strings of pipe stored in the sea with multiple systems available for separately, or simultaneously, supplying the strings to the drilling rig floor. Multiple guides and pipe drive systems also permits one system to be used while the other system is being serviced or repaired.

Figure 4:
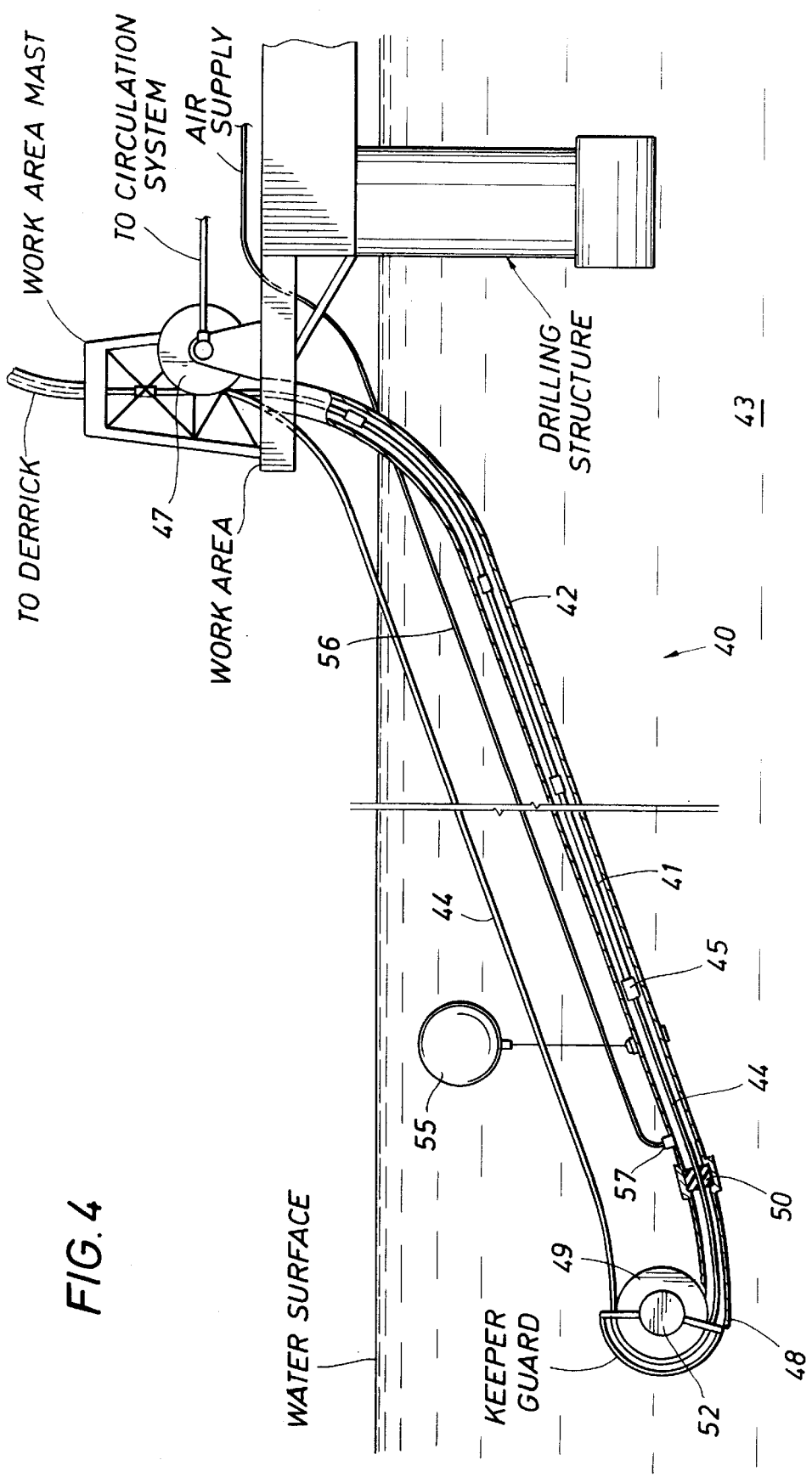
FIG. 4 is a schematic illustration of a drill string stored in a storage sleeve equipped with fluid circulation through the stored drill string and buoyancy control for the sleeve.

FIG. 4 illustrates a system indicated generally at 40 used to provide circulation through a drill string 41 stored within a storage sleeve 42 submerged in the sea 43. A flexible hose 44 is supplied with fluid pressure to circulate mud through the far end 45 of the drill string and back into the well bore to provide circulation into or from the well. The hose may also be used to displace the mud in the drill string as it is being removed from the well. The flow of the fluid through the hose and drill string may be reversed if desired.

The circulation hose 44 is stored on a hose reel 47 that has sufficient capacity to extend out to the end of the storage sleeve 42. A suitable mechanism such as the illustrated sprocket 49 is secured to the end 48 of the storage sleeve to feed the hose 44 into and out of the end of the sleeve. A sliding seal 50 positioned about the hose and within the storage sleeve provides a sliding engagement with the hose that prevents seawater from entering into the storage sleeve and prevents fluid within the sleeve from flowing into the sea. The hose and reel also function as a mechanism for pulling the drill string through the storage sleeve toward the end 48 of the storage sleeve. If desired, the sprocket may have a rotary power supply 52 providing motive power to directly pull the hose and drill pipe through the sleeve.

A flotation system 55 maintains the storage sleeve at a desired location below the water surface. An additional flexible hose 56 may be included to supply flotation air to the sleeve. The flotation air is injected into the sleeve at a point 57 between the sliding seal and the surface entrance 58 to the storage sleeve causing the water density in the sleeve to be reduced to the point required to allow the sleeve and its contents to achieve positive buoyancy. The flotation air may also be employed to positively displace water from the storage sleeve to attain the desired buoyancy.

Figure 5:
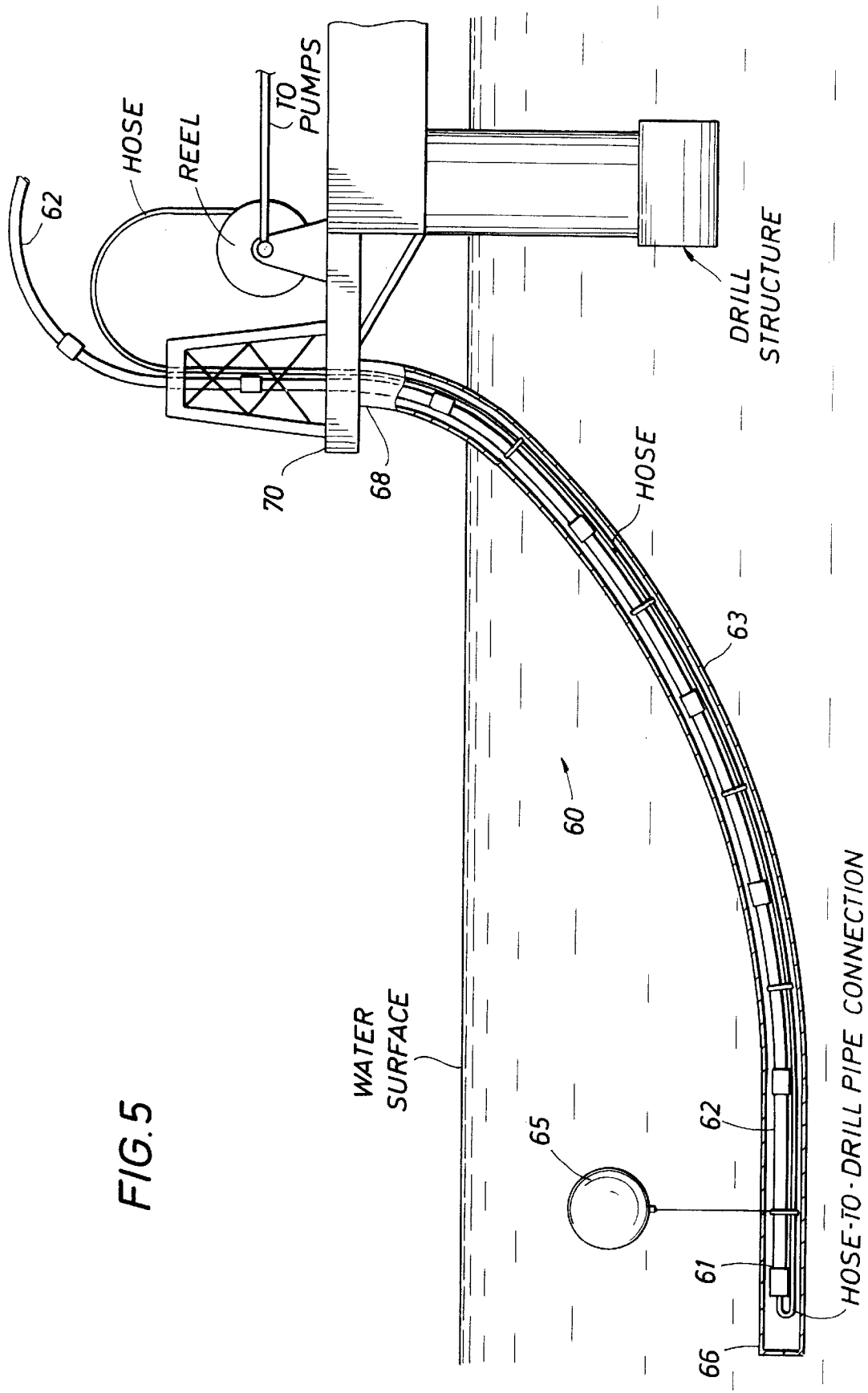
FIG. 5 is a schematic illustration of a drill string equipped with a circulation hose disposed within an optional storage sleeve.

FIG. 5 illustrates a form of the invention, indicated generally at 60, in which the circulation hose is attached to the end 61 of the pipe 62 before the pipe is run into the sea. The end of the hose and the end of the drill pipe are connected together to provide communication between the end of the drill pipe and the hose. The drill pipe and attached hose may be inserted into a storage sleeve 63 if desired. As with the previously described embodiments, circulation may be established between the mud system and the drill pipe 62 through the hose. A flotation system 65 is employed to maintain the drill pipe and attached hose at a desired depth below the water surface. The flotation system is attached to the sleeve when the sleeve is used.

When a storage sleeve system is employed, the far end of the sleeve 66 may be looped back to the drilling structure with the circulating hose being supplied from the outside of the sleeve at the far end of the sleeve. In this embodiment, which is similar to that illustrated in FIG. 4, the storage sleeve will loop from the drilling structure out into the sea and back to the drilling structure forming a large circular path. This embodiment minimizes the amount of hose required to connect between the drilling structure and the end of the drill pipe. In operation, before the drill pipe is introduced, the hose is fed from one end of the tube to the other, beginning from the exit end 66 of the sleeve and advancing to the entrance 68 to the sleeve at the work area 70. Before the drill pipe is introduced into the entrance to the sleeve, the hose contained within the sleeve is connected at its end, at the entrance to the sleeve, to the free end of the drill string extending from the curved guide into the work area. Once the hose is attached to the end of the drill string, circulation flow can be established from the pumping system on the drilling vessel. The circulation path is from the pumping system, through the hose reel 71, through the circulation hose as it extends through the sleeve in the sea, through the drill string and down the drill string into the well. As the drill pipe is pulled from the well and advanced into the sleeve, the reel takes up the hose coming from the exit end of the sleeve. The reel may also assist in pulling the hose and attached drill pipe through the sleeve. The hose may be equipped with an integral cable or other strong tension structure that permits it to exert a strong pulling force on the drill string.

Figure 6:
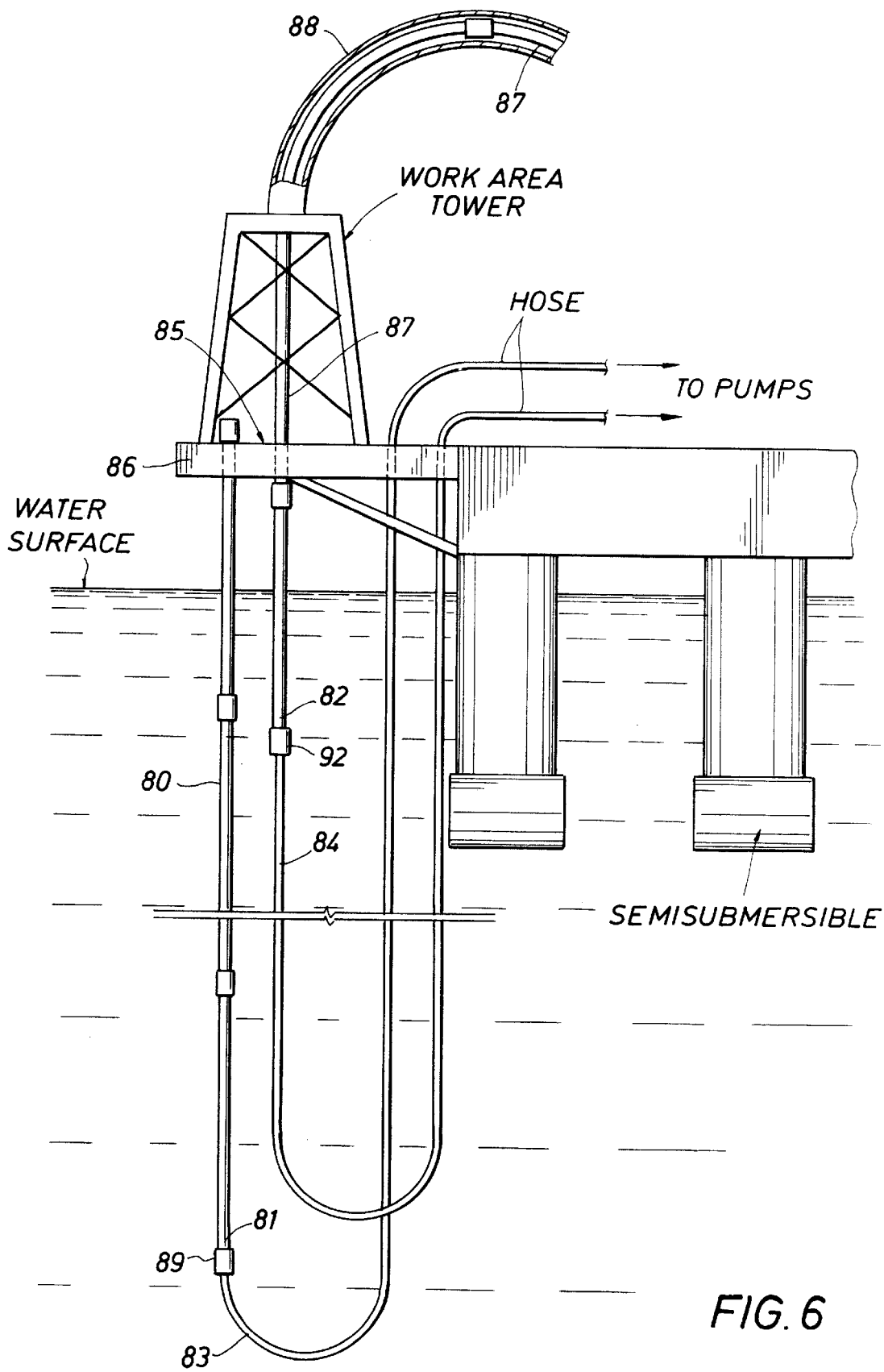
FIG. 6 is a schematic illustration of vertically racked pipe strings equipped with circulation hoses for pumping into the well.

FIG. 6 illustrates a technique for hanging off continuous lengths of jointed pipe from the drilling structure, such as indicated at 80. The bottoms 81 and 82 of the pipe strings are connected with flexible hoses 83 and 84 that are supplied with pressurized fluid from the pumping system. The work area platform 85 provides a rack or support structure 86 from which the stands may be supported. One stand 80 is illustrated supported from the work area platform. A second stand 87 is being moved through the curved guide 88 either into racking position or from the racking position to the well. As this movement occurs, the flexible hose 84 can continuously supply pressurized fluid to maintain circulation in the well or to displace fluid from the drill string. The water depth limits the length of the stands supported from the work platform. A remotely operated release may be provided for the hose connectors 89 and 90 to permit removal of the hoses from the end of a racked stand. The released connectors 89 and 90 may be retrieved to the support platform for use with the next stand to be racked.

While preferred forms of the present invention have been described in detail herein, it will be appreciated that many variations in the apparatus, methods and systems described may be made without departing from the spirit or scope of the inventions.

What is claimed is:

1. A semi-submersible drilling rig situated over a body of water for drilling a well through said body of water, said drilling rig having a drilling platform with a platform extension that projects extending laterally away from and beyond an edge of the drilling platform and over said body of water, said platform extension supporting rig to support a work area that receives a string of jointed pipe extending in a curved guide from a drilling rig floor on said drilling platform.

2. A rig as defined in claim 1 wherein said platform extension projects extends laterally from a corner of said drilling platform rig to attain a maximum spacing between said work area and said drilling rig floor.

3. A method of handling at least two pipe strings used by a drilling rig in the construction of a well comprising:
   forming first and second pipe strings by assembling multiple pipe joints end-to-end;
   storing said first and second pipe strings in a first area adjacent said drilling rig, said first area comprising a body of water in an area remote from a floor of said drilling rig; and
   simultaneously conducting drilling and/or completion operations from said drilling rig with said first and second pipe strings, and moving said first and second pipe strings between said first area and a second laterally spaced area along paths that curve at least 90 degrees, said paths having radii of curvature greater than the yielding radii of curvature of at least one of said pipe joints.

4. A method as defined in claim 3 wherein said second area is a floor of said drilling rig.

5. A method of handling pipe used by a drilling rig in the construction of a well comprising:
   forming a pipe string by assembling multiple pipe joints end-to-end;
   moving said pipe string between first and second laterally spaced areas along a path that curves at least 90 degrees, said path having a radius of curvature that is greater than a minimum non-yielding radius of curvature of said pipe joints;
   storing said pipe string in a body of water adjacent said rig; and
   circulating fluid through said pipe string while said pipe string is stored in said body of water.

6. A system for the drilling, working over or completing of wells from an offshore a drilling rig comprising:
   a drive mechanism included with said drilling rig to raise or lower a pipe string in a well at a first area on said drilling rig;
   a guide included with said drilling rig for directing said string along a path between said first area and a body of water located at a second area laterally away from said first area, said guide assisting in directing said string to curve at an angle exceeding 90 degrees along said path between said first and second areas;
   a pipe storage facility located in said body of water located at said second storage area for receiving and storing said pipe string; and
   a fluid pumping system connectable to said pipe string when said pipe string is stored in said storage facility for flowing fluid through said pipe string and into said well.

7. A system as defined in claim 6 further including a storage sleeve at said second area for receiving and storing said pipe string.

8. A system as defined in claim 7 further including a pulling system for pulling said drill string away from said well through said sleeve.

9. A system as defined in claim 7 further including an air supply system for providing air into said storage sleeve for regulating the buoyancy of said sleeve.

10. A system as defined in claim 7 further including a circulation hose attached to the end of said drill string with said circulation hose and drill string included side-by-side within said sleeve.

11. A method of handling pipe used in the construction of an offshore well, comprising:
    inserting or extracting pipe in said well in a continuous string of multiple connected joints;
    moving at least a portion of said continuous string along a path between said well and a body of water adjacent said well; and
    pumping fluid through said continuous string while at least a portion of said continuous string is in said body of water adjacent said well.

12. A method as defined in claim 11 further comprising curving said continuous string along a curve of at least 90 degrees during movement of said continuous string between said body of water and said well.

13. A method as defined in claim 12 further comprising suspending said continuous string in said body of water from a drilling structure constructing said offshore well.

14. A method as defined in claim 13 wherein of multiple continuous strings are suspended in said body of water from said drilling structure.

15. An apparatus for handling pipe used in constructing a well, comprising:
    a drilling platform rig having a derrick for raising and lowering a string of pipe in a said well;
    a guide for directing a string of pipe laterally along a path in a string between said well and a water area remote from said well;
    a storage sleeve for receiving and storing said string of pipe in said water area; and
    a pumping line for flowing fluids to said well through said string of pipe in said storage sleeve.

16. An apparatus as defined in claim 15 further including a system for pulling said string of pipe through said storage sleeve.

17. A system for the drilling, working over or completing of wells from an offshore drilling rig comprising:
    a drive mechanism included with said drilling rig to raise or lower a pipe string in a well at a first area on said drilling rig;
    a guide included with said drilling rig for directing said string along a path between said first area and a body of water located at a second area laterally away from said first area, said guide assisting in directing said string to curve at an angle exceeding 90 degrees along said path between said first and second areas;
    a pipe storage facility located at said second area for receiving and storing said pipe string;
    a fluid pumping system connectable to said pipe string when said pipe string is stored in said storage facility for flowing fluid through said pipe string and into said well;
    a storage sleeve at said second area for receiving and storing said pipe string; and
    an air supply system for providing air into said storage sleeve for regulating buoyancy of said sleeve.

* * * * *

UNITED STATES PATENT AND TRADEMARK OFFICE
CERTIFICATE OF CORRECTION

PATENT NO.     : 6,508,311 B1                                         Page 1 of 1
DATED          : January 21, 2003
INVENTOR(S)    : Carlos A. Torres It is certified that error appears in the above-identified patent and that said Letters Patent is hereby corrected as shown below:

Column 4,
Line 66, change "A semi-submersible drilling rig" to -- A drilling rig --.

Column 5,
Line 2, change "projects extending laterally" to -- projects laterally --.
Line 3, change "beyond_ an" to -- beyond an --.
Line 4, change "supporting rig to support a" to -- supporting a --.
Line 9, change "projects extends laterally" to -- projects laterally --.
Line 10, change "platform rig to" to -- platform to --.
Line 44, change "offshore a drilling" to -- offshore drilling --.
Line 56, change "second storage area" to -- second area --.

Column 6,
Line 3, change "regulating the buoyancy" to -- regulating buoyancy --.
Line 26, change "wherein of multiple" to -- wherein multiple --.
Line 31, change "platform rig having" to -- platform having --.
Line 32, change "lowering a string of pipe in a said" to -- lowering pipe in said --.
Line 34, change "in a string between" to -- between --.

Signed and Sealed this

Third Day of June, 2003

JAMES E. ROGAN
*Director of the United States Patent and Trademark Office*